United States Patent [19]
Föhl

[11] Patent Number: 5,738,293
[45] Date of Patent: Apr. 14, 1998

[54] BELT RETRACTOR WITH A BELT PRETENSIONER AND A FORCE LIMITING MEANS

[75] Inventor: Artur Föhl, Schorndorf, Germany

[73] Assignee: TRW Occupant Restraint Systems GmbH, Alfdorf, Germany

[21] Appl. No.: 727,014

[22] Filed: Oct. 8, 1996

[30] Foreign Application Priority Data

Oct. 20, 1995 [DE] Germany ............... 295 16 628.2

[51] Int. Cl.⁶ .................. B65H 75/48; B60R 22/28; B60R 22/34
[52] U.S. Cl. .................. 242/374; 242/379.1; 280/805; 280/807
[58] Field of Search .................. 242/374, 379.1; 280/805, 806, 807; 297/471, 472, 478

[56] References Cited

U.S. PATENT DOCUMENTS 5,526,996  6/1996  Ebner et al. .................. 242/374

FOREIGN PATENT DOCUMENTS 4314883  10/1994  Germany.

*Primary Examiner*—John Q. Nguyen
*Attorney, Agent, or Firm*—Tarolli, Sundheim, Covell, Tummino & Szabo

[57] ABSTRACT

A safety belt retractor comprises a frame, a belt reel rotatably mounted in the frame, and a rotary pretensioner drive adapted to be drivingly coupled to the belt drum. A force limiting torsion rod is connected to the belt drum for joint rotation. Blocking pawls are pivotally mounted on the torsion rod for cooperation with an internally toothed ring rigidly connected to the frame and surrounding the blocking pawls. The blocking pawls are spring biased to neutral positions out of engagement with the toothed ring. Retarding mechanism act on the blocking pawls to retard their movement out of a belt drum blocking position in engagement with said toothed ring to the neutral position.

6 Claims, 2 Drawing Sheets

BELT RETRACTOR WITH A BELT PRETENSIONER AND A FORCE LIMITING MEANS

BACKGROUND OF THE INVENTION

The invention relates to a belt retractor with a belt drum rotatably supported in a frame.

In such a belt retractor, peak loads occurring in the webbing during a collision of the vehicle can be dissipated by a force limiting member such as a torsion rod which has one end coupled with the belt drum for joint rotation and another end carrying one or more blocking pawls cooperating with ratchet teeth on the frame. A belt pretensioner drive engages the end of the torsion rod connected to the belt drum. The blocking pawls may be pivotally mounted on a carrier disk connected to the torsion rod. The pawls are biased by return springs into neutral positions out of engagement with the ratchet teeth on the frame.

During normal operation of the belt retractor the pawls are held by the associated return springs in the neutral position so that the belt drum is able to be rotated unhindered. The return springs are of such a size that they hold the pawls in the neutral position thereof even in the case of relatively rapid rotation of the belt drum at for example 1000 rpm or more against centrifugal force. On triggering the rotary drive for belt pretensioning the belt drum is firstly powerfully accelerated and may attain speeds of over 10000 rpm. Owing to the high centrifugal force and at the latest on sudden braking of the belt drum at the end of pretensioning rotation the pawls are deflected toward the ratchet teeth on the frame. During following forward displacement of the vehicle occupant the belt drum will turn in the opposite direction until the deflected pawls engage the ratchet teeth on the frame. Any further rotation of the belt drum is now only possible with twisting of the torsion rod, the desired effect of force limiting now occurring.

However, situations may be imagined in which the reversal of the rotary movement of the belt drum after the completion of belt pretensioning does not occur immediately but rather with a slight lag of for example a few milliseconds. Since the return springs on the pawls are relatively strong so that they securely prevent pivoting of the pawls by centrifugal force during normal belt retraction, they produce suitably high return forces and are able to whip the pawls back into their neutral positions. In such a case there would be an activation of the additionally provided vehicle-sensitive locking mechanism of the belt retractor, but there could be no force limitation by twisting of the torsion rod.

SUMMARY OF THE INVENTION

The present invention provides a belt retractor comprising a frame, a belt reel rotatably mounted in the frame, a rotary pretensioner drive adapted to be drivingly coupled to the belt drum and a force limiting member connected to the belt drum for joint rotation. At least one blocking pawl is pivotally mounted on the force limiting member. An internally toothed ring is rigidly connected to the frame and surrounds the blocking pawl. A spring is biasing the blocking pawl to a neutral position out of engagement with the toothed ring. In accordance with the invention the or each pawl is provided with a retarding means to delay its return movement into the neutral position. This retarding means is accordingly able to span any short period of time possibly elapsing between the end of the pretensioning and the start of the reverse rotation of the belt drum so that the pawls are still in the shifted position thereof, when this opposite rotation of the belt drum starts on forward displacement of the vehicle occupant. Accordingly the pawl reliably comes into engagement with the ratchet teeth means on the frame.

The retarding means may be embodied in a number of different forms. A particularly simple design is one in which the retarding means is constituted by a friction element in permanent sliding engagement with the pawl and more particularly a friction element formed on the return spring itself.

The retarding means may however also be formed by a detent means, which releaseably holds the pawl in a deflected position. Using such a design it is possible for periods of time of any desired length to be spanned between the end of the pretensioning operation and the opposite rotation of the belt drum. The return movement of the pawls into the neutral position is then performed by the normal retracting spring, which after a vehicle crash rotates the belt drum in the retracting direction, the pawls being repelled from the ratchet tooth means on the housing so that the locking action is discontinued.

As an alternative, or additionally, the pawl may be coupled by a detent means in its neutral position in a releasable manner with the return spring and be uncoupled therefrom in its deflected position. In such an embodiment the return spring is ineffective as long as the pawl is deflected; here as well the retractor spring is repelled at the ratchet tooth means on take-up rotation of the belt drum by the retraction spring so that the return spring will now re-engage the pawl and move back same completely into the neutral position.

Further features and advantages of the invention will be gathered from the following description and the drawings, to which reference should be had.

DESCRIPTION OF THE PREFERRED EMBODIMENTS

Figure 1:
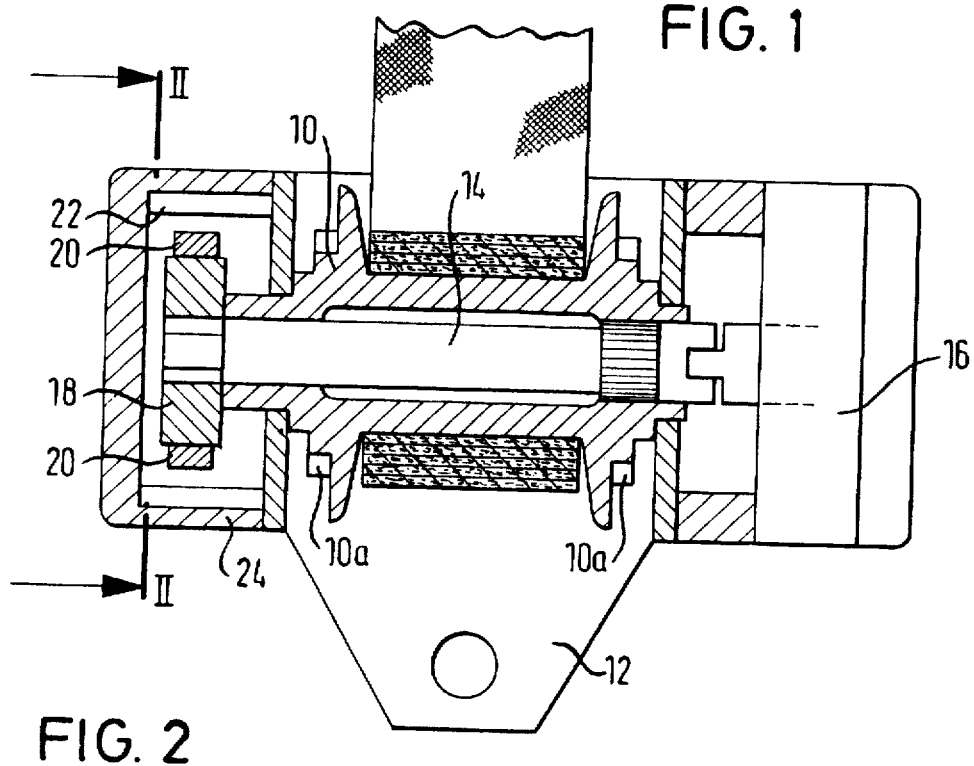
FIG. 1 shows a diagrammatic longitudinal section taken through a belt retractor.
Figure 2:
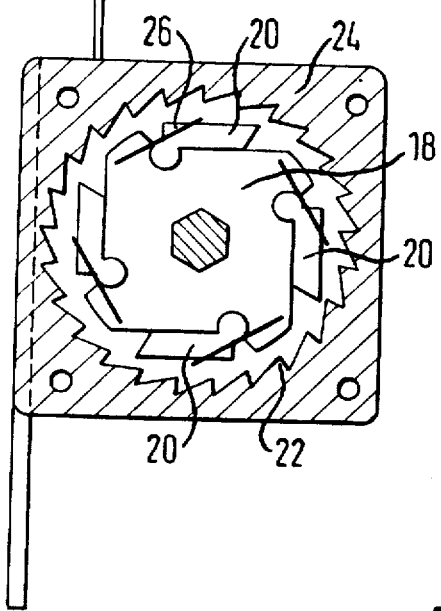
FIG. 2 shows a cross section taken through the belt retractor on the line II—II of FIG. 1.

In the embodiment depicted in FIG. 1, a belt retractor has a belt drum 10 rotatably mounted in a frame 12. The belt drum 10 is hollow in design. Coaxially extending through the belt drum 10 there is a torsion rod 14, whose one end is connected in such a manner as to prevent relative rotation by splines with the belt drum 10 and is able to be coupled with a rotary drive 16, only indicated diagrammatically, for belt pretensioning. At the other end of the torsion rod 14 a support disk 18 is connected in such a manner as to prevent relative rotation. On the support disk 18 four pawls 20 are pivotally mounted. The pawls are surrounded by ratchet tooth means 22 formed on the inner side of a ring 24 connected in a load transmitting fashion with the frame 12.

Each of the pawls 20 is urged by a return spring 26 into its neutral position in engagement with the outer periphery of the support disk 18. The return spring 26 can be designed in the form of a strip spring or a piece of spring wire.

During normal retraction operation of the belt retractor the rotary drive 16 is decoupled from the torsion rod 14 and the belt drum 10; furthermore the pawls 20 are held by the associated return springs 26 in the neutral position. The belt drum 10 is consequently able to be rotated without hinderance. On triggering of the rotary drive for belt pretensioning the latter is coupled via a coupling (not illustrated) with the torsion rod 14 and by way of same causes rotation of the belt drum 10. The belt drum 10 reaches a speed of rotation far in excess of 10,000 rpm within a few milliseconds so that the pawls 20 are deflected out of position toward the ratchet tooth means 22. At the end of the belt pretensioning rotation the belt drum 10 is sharply arrested so that the pawls 20 are additionally deflected out of position by inertia toward the ratchet tooth means 22. Directly following this there is normally reverse rotation of the belt drum 10 owing to the forward displacement now occurring of the vehicle occupant. During such reverse rotation at least one of the pawls 20 will engage the ratchet tooth means 22.

Since, however, one cannot exclude the possibility of a short time elapsing between the end of the belt pretensioning rotation and the reverse rotation of the belt drum, during which time the relatively strong return springs 26 may move the pawls 20 back toward their neutral positions, in accordance with the invention measures are adopted in order to delay return movement of the pawls into the neutral positions.

Figure 3:
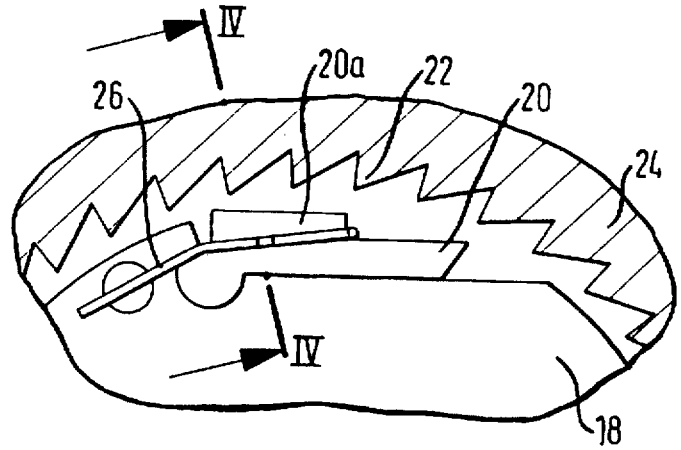
FIG. 3 shows part of the structure of FIG. 2 on a larger scale.
Figure 4:
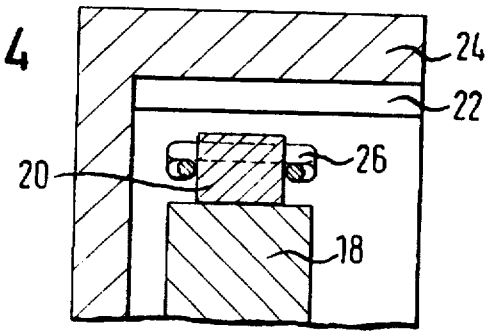
FIG. 4 shows a cross section taken on the line IV—IV of FIG. 3.
Figure 5:
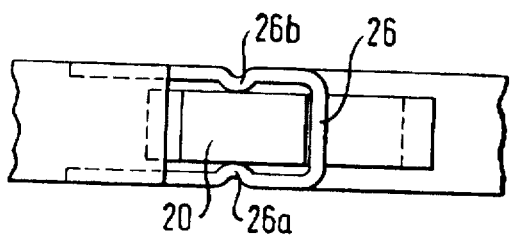
FIG. 5 shows a plan view of the pawl together with the return spring as illustrated in FIGS. 3 and 4.

In the embodiment depicted in FIGS. 3 through 5 the return spring 26 is designed in the form of a U-like loop, whose limbs are clamped at their free ends on either side of the support disk 18. The opposite loop part fits around a ledge 20a on the back of the pawl 20. On each limb of the return spring 26 an inwardly directed embossed pit 26a and 26b is provided, which is in sliding engagement with the side of the pawl 20. The pits 26a and 26b each constitute a friction element, which on shifting of the pawl 20 slides over its side surface. Owing to the friction effect then occurring the return movement of the pawl into its neutral position is sufficiently delayed so that at the end of belt pretensioning the pawls 20 will reliably snap into engagement with the ratchet tooth means.

Figure 6A:
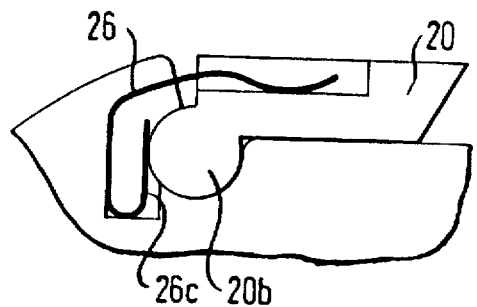
FIGS. 6a to 6e show views of parts of a pawl on a larger scale with a return spring in accordance with several embodiments.

In the embodiment illustrated in FIG. 6a the return spring 26 is provided with a resilient limb 26c in permanent sliding engagement with the periphery in the circular bearing member 20b of the pawl 20. Here as well the return movement of the pawl 20 is delayed by the friction effect then occurring.

Figure 6B:
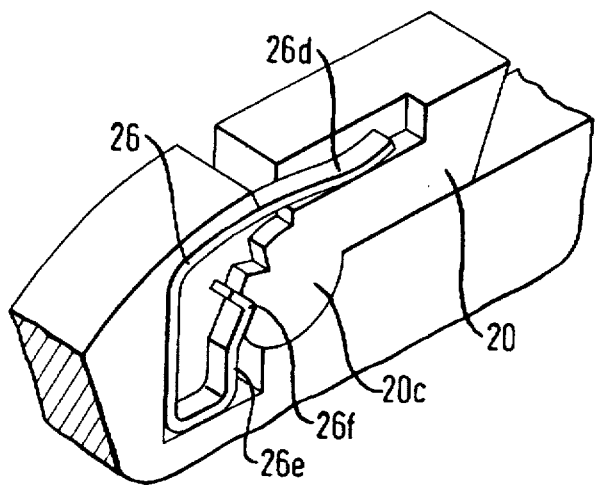

In the design illustrated in FIG. 6b one limb 26d of the return spring 26 abuts the back of the pawl 20. A further limb 26e of the return spring 26 is provided with a detent spur 26f adapted snap into a notch on the bearing part 20c of the pawl 20. The detent spur 26f fits into the notch when the pawl 20 is shifted out of position. Accordingly the pawl 20 will be steadily held in the deflected position after it has been shifted. It is only on rotation of the belt drum 10 and accordingly of the carrier disk 18 in the retraction direction and under the action of the belt retraction spring that the pawl is moved back out of its deflected position toward its neutral position since it is repelled by the backs of the teeth in the ratchet tooth means 22. When this happens the detent spur 26f will come clear of the notch on the bearing part 20c of the pawl 20 so that the return spring 26 will now be moved back the pawl 20 by its spring limb 26d completely into the neutral position. The belt drum is now freely rotatable again.

Figure 6C:
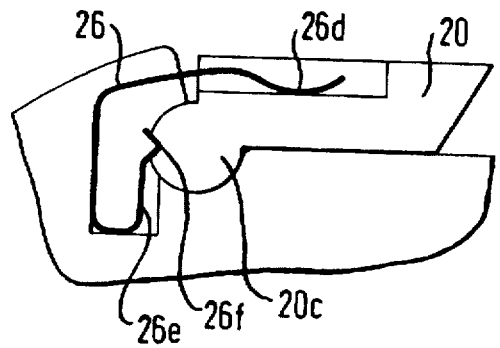

In the embodiment of FIG. 6c the return spring 26 also possesses a spring limb 26d resting on the back of the pawl 20 and furthermore a limb 26e with a detent spur 26f. However this detent spur 26f, in the neutral position of the pawl 20, fits into the notch on its bearing part 20c. As long as the detent spur 26f is in the notch, a relatively high force is necessary in order to shift the pawl 20. In the shifted state, on the other hand, when the detent spur 26f has cleared the notch in the bearing part 20c, only the relatively weak spring limb 26d will act with the result that likewise the return movement of the pawl 20 toward its neutral position will be sufficiently delayed.

Figure 6D:
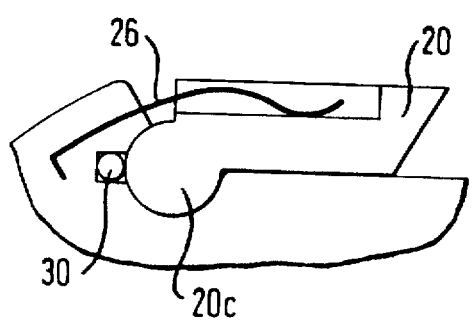

In the embodiment depicted in FIG. 6d a checking or latching means acting independently from the return spring 26, is constituted by a rolling body 30, which is held elastically in frictional engagement with the circular periphery of the bearing part 20c of the pawl 20.

Figure 6E:
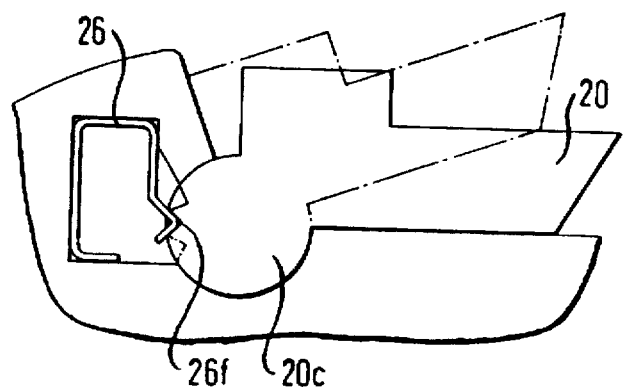

FIG. 6e lastly shows a preferred embodiment, in the case of which the pawl 20 may assume two stable positions: the one neutral position indicated in continuous lines and the deflected position indicated in broken lines. The return spring 26 again possesses a detent spur 26f, adapted however to selectively come into engagement with one of two detent notches on the periphery of the bearing part 20c of the pawl 20. In this embodiment as well the pawl 20 is firstly repelled during retraction rotation of the belt drum under the action of the retraction spring on the backs of the teeth of the ratchet tooth means 22, the detent spur 26f coming clear of the respective notch in the bearing part 20c in the pawl 20, following which the detent spur 26f fits into the second notch and accordingly moves the pawl 20 completely back into its neutral position.

It remains to be added that the belt retractor is additionally provided with a conventional locking mechanism which is responsive to vehicle deceleration and to sudden withdrawal of belt webbing, such mechanism being omitted from figure for the sake of simplicity. The locking mechanism will more particularly comprise two pawls rigidly ganged together and adapted to cooperate with ratchet tooth means 10a formed on the flanges of the belt drum 10. Moreover in practical forms of the belt retractor the ring part 24 is rotatably mounted on one side limb of the housing 12 for limited rotation. The limited rotation of the ring part 24 is converted into a drive movement by which the locking mechanism is put out of operation, when the locking mechanism consisting of the pawls 20 and the internal tooth means 22 is operative.

Finally it is to be added that in the embodiments of FIGS. 6b, 6c and 6e the detent spur may as an alternative be formed on the pawl 20 and the corresponding notch in a limb of the return spring 26.

I claim:

1. A safety belt retractor comprising a frame, a belt drum rotatably mounted in said frame, a rotary pretensioner drive adapted to be drivingly coupled to said belt drum, a force limiting member connected to said belt drum for joint rotation, at least one blocking pawl pivotally mounted on said force limiting member, an internally toothed ring rigidly connected to said frame and surrounding said blocking pawl, a spring biasing said blocking pawl to a neutral position out of engagement with said toothed ring, and retarding means acting on said blocking pawl to retard movement of said blocking pawl from a belt drum blocking position in engagement with said toothed ring to said neutral position.

2. The belt retractor of claim 1, wherein said retarding means are formed by a friction member engaging said blocking pawl.

3. The belt retractor of claim 2, wherein said friction member is formed on said biasing spring.

4. The belt retractor of claim 1, wherein said retarding means are formed by latch means which releasably latch said blocking pawl in a readiness position adjacent said internally toothed ring.

5. The belt retractor of claim 4, wherein said latch means are formed by a latching nose and a mating latching recess a first one of which is formed on said blocking pawl and a second one of which is formed on said biasing spring.

6. The belt retractor of claim 1, wherein latching means are provided for releasably coupling said blocking pawl with said biasing spring when in said neutral position, said blocking pawl being uncoupled from said biasing spring when pivoted out of said neutral position.

* * * * *